United States Patent [19]

Bauman et al.

[11] Patent Number: 5,814,206
[45] Date of Patent: Sep. 29, 1998

[54] PASSIVE ACID TAR NEUTRALIZATION PROCESS

[75] Inventors: Jeffery P. Bauman, Lewisville; Richard W. McManus, Copper Canyon, both of Tex.

[73] Assignee: Sound-epic Environmental Services, Carrollton, Tex.

[21] Appl. No.: 771,881

[22] Filed: Dec. 23, 1996

Related U.S. Application Data

[63] Continuation of Ser. No. 569,752, Dec. 8, 1995, abandoned.

[51] Int. Cl.⁶ .................................................. C10G 17/00
[52] U.S. Cl. .............................. 208/13; 208/179; 208/180
[58] Field of Search .............................. 208/13, 179, 180

[56] References Cited

U.S. PATENT DOCUMENTS

| | | | |
|---|---|---|---|
| Re. 31,267 | 6/1983 | Edgar et al. | 208/13 |
| 4,114,162 | 9/1978 | Edgar et al. | 208/13 |
| 5,049,256 | 9/1991 | Luce | 208/13 |
| 5,234,485 | 8/1993 | Bölsing | 210/702 |
| 5,413,616 | 5/1995 | Bölsing | 77/71 |

*Primary Examiner*—Helane Myers
*Attorney, Agent, or Firm*—Stefan J. Kirchanski; Graham & James

[57] ABSTRACT

An improved process for neutralization of acid tars employs a bulk neutralizing agent having a specific gravity greater than that of the acid tar to be neutralized. The bulk neutralizing agent, generally in excess of an amount sufficient to accomplish neutralizing, is spread on top of the acid tar. The neutralizing agent will then begin to sink into the tar. The sinking occurs at a slow rate which is a function of tar viscosity, tar specific gravity, neutralizing agent specific gravity, and temperature. As the neutralizing material sinks into the acidic tar it reacts with the acid neutralizing the tar in situ and depleting the neutralizing agent. Not only does the reaction increase the pH of the tar, it also produces a reaction product with improved physical properties which promotes ease in handling. Depending upon the rate at which the neutralizing agent sinks into the tar and the depth of the tar, an entire mass of acid tar waste can be neutralized in a matter of months or even weeks with no need to actively mix the neutralizing agent and the tar.

9 Claims, 2 Drawing Sheets

PASSIVE ACID TAR NEUTRALIZATION PROCESS

This is a continuation of application Ser. No. 08/569,752, filed Dec. 8, 1995, for PASSIVE NEUTRALIZATION PROCESS, now abandoned.

BACKGROUND OF THE INVENTION

1. Field of the Invention

The present invention concerns the field of environmental remediation and, more specifically, involves an improved in situ process for neutralization of acid tar.

2. Description of Related Art

During the early part of this century petrochemical and petroleum refining industries used acid filtration processes in refining certain lubricating oils and other petroleum-based products. While these processes produced many useful products, they also generated large volumes of sludgy tar as a waste product. These tars were generally discarded without further treatment by discharging them into unlined waste pits.

Over the years, tens of thousands and even hundreds of thousands of tons of these materials have accumulated. The waste from acid filtration and refining of petroleum is characteristically a heterogeneous semisolid tar with an extremely low pH. When disturbed, as during excavation activities, the tar releases lethal levels of sulfur dioxide, an irritating and poisonous gas. To make matters even worse, the pits were often used for disposal of other noxious materials as well, thereby rendering the tar a particularly unpleasant toxic cocktail.

Today, disposal of toxic wastes by burial is no longer permitted because such materials do not remain in one place. They often leach into and contaminate ground water. At times whole neighborhoods, like the infamous Love Canal, are contaminated when long-forgotten buried wastes migrate to the surface. Therefore, current environmental regulations require these pits be remediated so that the land can be safely reclaimed.

In order to remediate these pits it is usually necessary to disturb the tar as during excavation or when mixing reagents with the material. If carried out in an uncontrolled manner, sulfur dioxide emissions from these activities are unacceptable as they can threaten worker safety or the safety of those downwind of the work, not to mention exacerbation of general air pollution problems. To minimize toxic releases remediation activities are generally carried out by first neutralizing the waste in situ to render it safe for subsequent excavation and handling.

To date, in situ neutralization has generally been carried out by mixing an inexpensive, bulk neutralizing agent with the acid tar prior to excavation. Neutralizing agents used have included calcium hydroxide powder, calcium hydroxide slurry, limestone screenings, limestone rock, fly ash, and kiln dust. Mixing has been accomplished using conventional construction equipment modified for the task. For example, conventional backhoes, backhoes modified by the addition of injection fingers to apply liquid neutralizing reagent, and road graders have all been used. These active reagent mixing approaches are costly and are virtually impossible to carry out without some emissions and associated potential for worker and community exposure.

OBJECTS AND SUMMARY OF THE INVENTION

It is the object of this invention to provide an improved and simplified method of accomplishing acid tar neutralization without active reagent mixing to achieve neutralization. This improved process will reduce the cost of neutralization and the accompanying exposure risk to workers and community.

The method involves the use of a bulk neutralizing agent having a specific gravity significantly greater than that of the acid tar to be neutralized. The bulk neutralizing agent, in excess of an amount sufficient to accomplish neutralizing, is spread on top of the acid tar. The neutralizing agent is selected so that its density exceeds that of the tar. The neutralizing agent will then begin to sink into the tar. The sinking occurs at a slow rate which is a function of tar viscosity, tar specific gravity, neutralizing agent specific gravity, and temperature.

As the neutralizing material sinks into the acidic tar it reacts with the acid neutralizing the tar in situ, depleting the neutralizing agent. Not only does the reaction increase the pH of the tar, it also produces a reaction product with improved physical properties which promote ease in handling. Depending upon the rate at which the neutralizing agent sinks into the tar and the depth of the tar, an entire mass of acid tar waste can be neutralized in a matter of months or even weeks with no need to actively mix the neutralizing agent and the tar.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENTS

Figure 1:
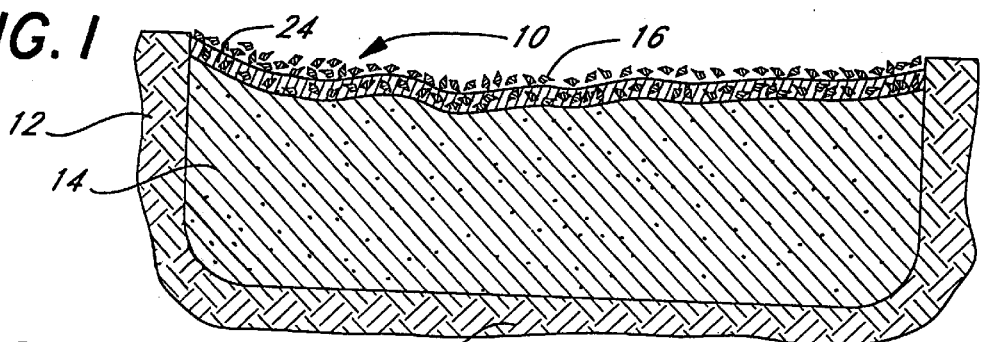
FIG. 1 is a diagrammatic cross-section of a earthen pit containing acid tar with a cap of neutralizing agent.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a process for neutralization of acid tars wherein a neutralizing agent sinks through the tar under its own weight affecting neutralization without need for mixing and without release of toxic gases.

The present invention operates because acid tars are semiliquid viscous mixtures. This viscous property normally makes neutralization and remediation of the tars especially difficult because the tars resist attempts to mix in neutralizing agents. Further, in attempting to mix in neutralizing agents dangerous emissions are released. However, the semiliquid character of the tars means that if a material denser than the tar is placed on top of the tar, it will gradually sink through the tar.

Numerous neutralizing reagents have specific gravities greater than acidic tars, which vary in specific gravity from 0.7 to 1.1. Examples of such materials are limestone (calcium carbonate, $CaCO_3$), dolomite or dolomitic limestone (a mixture of calcium carbonate, $CaCO_3$ and magnesium carbonate, $MgCO_3$), and borax stone which contains sodium carbonate ($Na_2CO_3$). The specific gravity of these materials ranges from 2.7 to 2.8. The acid component of acid tars is typically sulfuric acid, $H_2SO_4$, but also may include other mineral acids and acid reaction products. For example, sulfuric acid oxidizes many organic compounds releasing sulfur dioxide, $SO_2$, as the corresponding reduction product. Sulfuric acid and sulfur dioxide react with neutralizing agents to form the sulfite or sulfate as is shown in the following examples in which limestone is used as a neutralizing reagent:

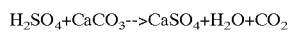

$$H_2SO_4 + CaCO_3 \rightarrow CaSO_4 + H_2O + CO_2$$

$$SO_2 + CaCO_3 \rightarrow CaSO_3 + CO_2$$

As these and similar reactions occur, the neutralizing agent is consumed and harmless water and carbon dioxide are released. Because the neutralizing agent is consumed, it is necessary to place a sufficient excess of the agent on the tar so that, after accounting for neutralization of the acid contained in the tar, there will be enough neutralizing agent to ensure penetration through the entire depth of the tar.

Penetration of the neutralizing agent is relatively slow, owing to the viscous nature of the tar, while the acid-base reactions leading to neutralization are rapid. This results in the entire volume of tar being neutralized by the agent over time without need for aggressive mixing. The primary route of neutralization is through direct contact and diffusion. As the neutralizing agent sinks through the tar, neutralization occurs on the surface of the agent. Diffusion results in attenuation of pH in the tar adjacent to areas of surface to surface contact.

The neutralization process releases water, thereby creating a watery milieu which allows relatively rapid diffusion of the hydrogen ions. Further, the neutralization reaction is exothermic so that localized heating decreases the viscosity of the tar allowing the neutralizing agent to penetrate more rapidly through the tar.

As the neutralizing agent sinks through the tar, it is consumed at the tar-solid interface. The motion of the neutralizing agent as it sinks exposes fresh agent to interact with acidic tar. Eventually, particles of the neutralizing agent are totally consumed, or consumed to a point where the particle size has been so reduced that it no longer retains sufficient mass to sink at a significant rate. These small particles are retained within the tar mass as larger unreacted particles continue to sink.

In the end, the entire cross-section of the tar body has been neutralized by the sinking neutralization agent, and small particles of neutralizing agent can be found suspended throughout the tar body cross-section. The presence of suspended neutralizing agent particles can be very important in subsequent waste stabilization. Frequently, waste tars of this type are remediated using stabilization processes that involve cementing reagents, such as Portland cement or cement kiln dust. Performance standards for these stabilization systems require achievement of prescribed unconfined compressive strength levels for the stabilized mass, frequently of 25 psi or greater. In performing stabilization of acid tar that has been neutralized using the process described herein, the particles of undissolved neutralization agent found throughout the mass behave like aggregate in a cement mix and significantly increase the compressive strength of any given mixture, and/or reduce the amount of cementing reagent (i.e., Portland cement) required to achieve the prescribed compressive strength.

Whereas the prior art has relied on mechanical mixing of relatively fine neutralizing agent (i.e., <100 mesh or <⅛"), the present invention reveals the advantages of passive mixing of relatively coarse material. In addition, coarse material is frequently less expensive than more finely ground agents. Powdered neutralizing agent (<⅛") does not generally sink as effectively as larger pieces of neutralizing material, if it sinks at all. Thus, this technique is best applied using coarse grades of neutralizing material such as limestone quarry screenings (>⅜" to 1"). Even coarser grades of stone can also be used; however, the reduced surface area of very coarse materials reduces method efficiency as most neutralizing agents are not consumed in the process. Field tests are recommended to determine the coarseness of neutralizing material best applicable to a specific acid tar.

An additional benefit to this form of neutralization is the formation in situ of the sulfate and sulfite reaction products. These reaction products are dry solids. Some, such as calcium sulfate (gypsum), are desiccating agents capable of binding several times their weight in water. When these reaction products are formed, the organic tar materials are dispersed through and absorbed onto the reaction products. This converts the viscous tar into a material with a friable character, thereby making excavation and other material handling efforts much easier.

EXAMPLE 1

An acid tar residue from lubricating oil refining was land disposed in pits between the years of 1900 to 1950. In the 1990s development of adjacent property and associated environmental concerns necessitated the material be stabilized and landfilled. Stabilization was to be accomplished with a lime-based process which required excavation of the waste and processing within treatment equipment. However, the proximity of adjacent light industry necessitated in situ neutralization prior to excavation to minimize toxic emissions.

Instead of an aggressive mixing of neutralizing agent with the tar as is normally done, in situ passive neutralization was chosen. In this case the tar had been discarded in the form of ponds approximately 10 feet in depth. The acidity of the tar ranged from 75,000 mg/kg to 150,000 mg/kg calculated as $CaCO_3$. A locally-available limestone quarry screening material (¾" minus) was selected as the neutralization agent. The material was available for the cost of $3.50 per ton delivered to the site. Quarry data on purity and void space showed the screenings to contain 68% calcium carbonate per cubic foot, the balance being void space and inert material. It was calculated that neutralization would require a three-and-one-half-foot layer of limestone screenings to accomplish neutralization and have sufficient excess to assure complete penetration. This layer was applied to the pond surface and allowed to sink into the tar. FIG. 1 shows a diagrammatic cross-section of the tar pond 10 dug into surrounding ordinary soil 12. The pond 10 is filled to near its top with acid tar 14 and covered with a three and one half foot thick limestone cap layer 16.

Figure 2:
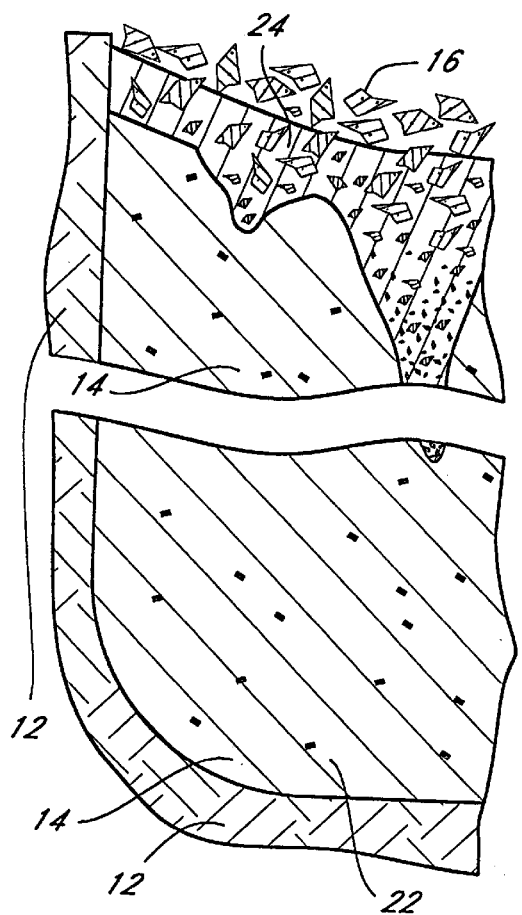
FIG. 2 shows the tar of FIG. 1 after sufficient passage of time for the neutralizing agent to partially sink through the tar.
Figure 3:
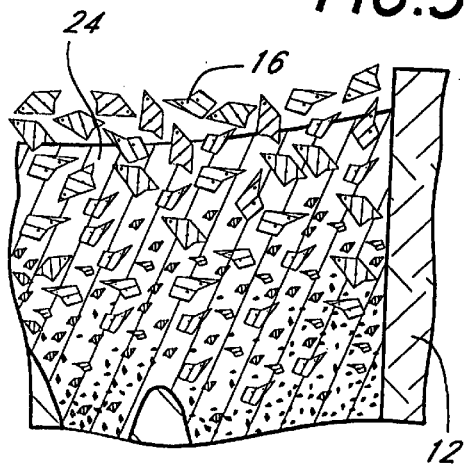
FIG. 3 shows the tar of FIG. 2 after an additional passage of time.

FIG. 2 shows a diagram of the tar pond 10 after about one month. Approximately one foot of limestone layer 16 has disappeared below the surface of the tar 14. An intermediate zone of reaction product 22 has formed between the acid tar 14 and the limestone cap layer 16. FIG. 3 shows the pond 10 after about an additional month. The zone of reaction product 22 has nearly reached the bottom of the pond 10.

Figure 4:
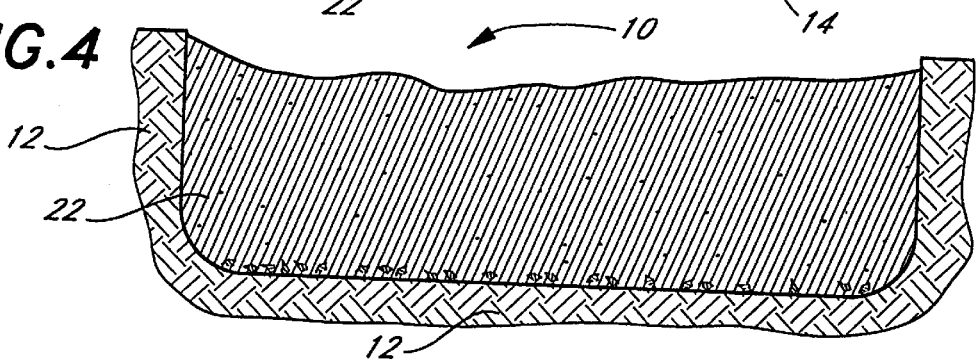
FIG. 4 shows the tar after neutralization is complete and the neutralizing agent has penetrated completely into the tar.

FIG. 4 shows the pond 10 after about three months. There is no evidence of the limestone layer 16 visible on the surface of the tar 14. Later test excavations demonstrated that limestone reaction product 22 could be found throughout the full ten-foot depth of the tar pond. The pH of the tar after reaction varied from 4.5 to 5.5. The tar reaction product 22 which replaced the tar 14 exhibited greatly improved handling characteristics as compared to the original acid tar 14. When the reaction product 22 was excavated no hazardous emissions were generated.

EXAMPLE 2

Example 2 represents a test of an alternate embodiment of the present invention on the same acid tar residue as in Example 1. The goal of this experiment was to attempt to accelerate the neutralization process. Settling of the limestone was accelerated by driving a vibratory compactor or other heavy equipment, vibratory or otherwise, over the surface of the tar in an effort to force the limestone into the tar.

It was found that such treatment greatly accelerated the initial movement of the limestone into the tar. It is hypothesized that trapped air may slow the initial interpenetration of the limestone and the tar. By mechanically forcing at least some of the limestone through the tar interface, part of the entrapped air is driven off, allowing the limestone to more rapidly react with and sink into the tar thereafter.

EXAMPLE 3

An acid tar residue from lubricating oil refining had been land disposed in pits covering over 10 acres with depths ranging from 10 to 50 feet. The pits were found to safely contain the waste with no significant contamination of groundwater being caused by the stored tar. However, the highly acidic character of the tar was affecting rain runoff from the pits, with surface water runoff to a local stream having a pH of between 2.0 and 4.0.

The refinery desired action to alleviate the acidification of surface waters. Alternatives evaluated considered covering the pits with synthetic liners, stabilizing the waste tar with various cement-like reagents and capping the pits with an impervious layer. However, these potential solutions were considered to be either too temporary or too expensive.

Consequently, in situ passive neutralization was chosen as a method to permanently eliminate or reduce the acid runoff and concomitant damage to surface waters. In addition, this approach could lead to total neutralization of the pit waste over time.

The total acidity of the tar and the depth of the pits was not of immediate concern in this case. The primary goal was to achieve rapid increases in pH of runoff water. Therefore, all that was required was the application of a surface layer of limestone rock. A one-foot-thick layer was spread during the winter when the soft tar best supported the weight of construction equipment. To ensure rapid surface neutralization, a particle distribution of rock with 60% passing a #4 mesh was selected because the smaller particles sink more slowly and tend to become permanently suspended in the tar. This results in upper layers of the tar becoming neutralized even if sufficient limestone is not added to achieve neutralization completely to the bottom of each pit.

As the limestone rock disappeared into the ponds, additional material was spread on top. Over time the rate of limestone subsidence decreased. It is anticipated that fresh limestone will be added over time until complete neutralization is achieved. Probably the formation of calcium sulfate and calcium sulfite were responsible for slowing of the subsidence as these materials impart a more soil-like characteristic (i.e., not semiliquid) to the tar. In any case, the added limestone kept the water runoff to above pH 6.5, while the tar surface measured between pH 5 and 8.

Figure 5:
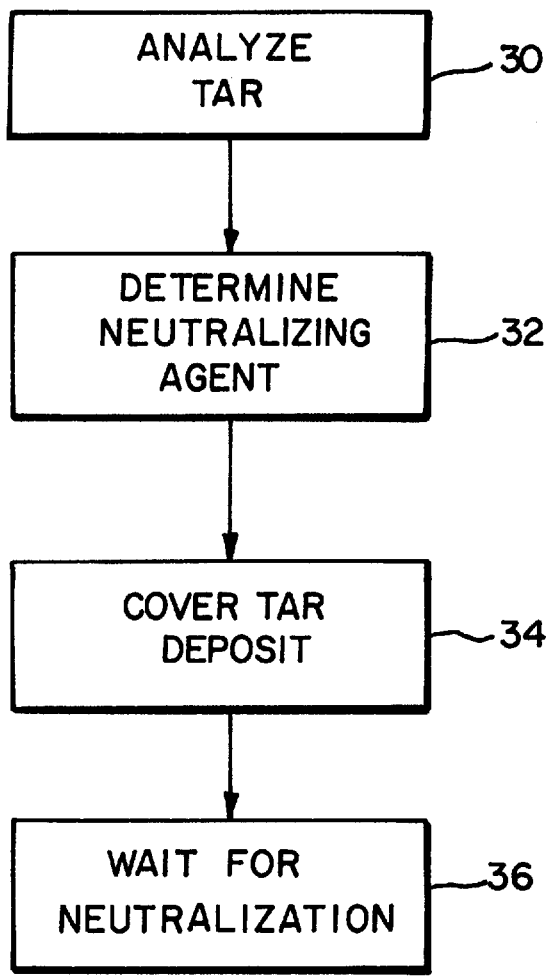
FIG. 5 shows a flow chart of the method of the current invention.

FIG. 5 shows a flow chart of the method of the present invention. In a first step 30 the tar of a deposit to be treated is analyzed to determine the volume of material, the overall acidity, viscosity and specific gravity of the tar so that the type, grade and amount of neutralizing agent to be determined in a second step 32. The analysis and the calculation steps 30, 32 can be optional. An estimated amount of neutralizing agent can be used with additions or removals after a sufficient passage of time (generally several months).

In a third step 34 the tar deposit is covered with a depth of neutralizing material sufficient to provide the amount calculated in the earlier step 32. Finally, in a last step 36 one waits for the neutralizing material to sink into the tar and effect neutralization. The exact time depends on the type of tar, the ambient temperature and the type (i.e., size and density) of the neutralizing material.

Applied in accordance with the teachings of this invention, this improved means of neutralization will eliminate or minimize the need for actively mixing neutralizing agent with the acid tar, thereby eliminating or minimizing emissions generated in tar excavation and handling. Further, owing to the reagent addition and in situ formation of certain reaction products, tar with improved handling properties results.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A process for in situ neutralization of acid tar without actively mixing the tar comprising the steps of:

covering a deposit of acid tar with a layer of coarse grade neutralizing agent having a specific gravity in excess of that of the deposit and a particle size greater than about 1/8 inch, depth of the layer being selected to provide sufficient neutralizing capacity to neutralize at least the entire deposit;

waiting sufficient time for the layer of neutralizing agent to sink completely into the deposit of tar; and neutralizing the deposit without actively mixing the neutralizing agent and the deposit as the neutralizing agent sinks into the deposit.

2. The method of claim 1, wherein the neutralizing agent is selected from the group consisting of limestone, dolomite, and borax stone.

3. The method of claim 1, wherein following the covering step heavy equipment is moved over the neutralizing agent to accelerate penetration of the neutralizing agent into the deposit.

4. The method of claim 1, wherein following the covering step equipment is used to vibrate the neutralizing agent to accelerate penetration of the neutralizing agent into the deposit.

5. A process for in situ neutralization of acid tar without actively mixing the tar comprising the steps of:

analyzing a deposit of acid tar to determine specific gravity of the acid tar, and total acidity of the deposit;

calculating a volume of coarse grade neutralizing agent having a specific gravity in excess of that of the acid tar and a particle size greater than about ⅛ inch and having alkalinity at least sufficient to neutralize the deposit;

covering the deposit of acid tar with a layer of a neutralizing agent having the calculated volume;

waiting sufficient time for the layer of neutralizing agent to sink completely into the deposit of tar; and neutralizing the deposit without actively mixing the neutralizing agent and the deposit as the neutralizing agent sink into the deposit.

6. The method of claim 5, wherein the neutralizing agent is selected from the group consisting of limestone, dolomite, and borax stone.

7. The method of claim 5, wherein following the covering step heavy equipment is moved over the neutralizing agent to accelerate penetration of the neutralizing agent into the deposit.

8. The method of claim 5, wherein following the covering step equipment is used to vibrate the neutralizing agent to accelerate penetration of the neutralizing agent into the deposit.

9. A process for in situ neutralization of acid tar deposits without actively mixing the deposits so that runoff water is not acidic comprising the steps of:

covering a deposit of acid tar with a layer of coarse grade neutralizing agent having a specific gravity in excess of that of the deposit and a particle size greater than about ⅛ inch, depth of the layer being selected to provide sufficient neutralizing capacity to neutralize at least an upper region of the deposit;

allowing the layer of neutralizing agent to sink into the deposit of tar; and neutralizing the upper region of the deposit as the layer of neutralizing agent sinks into the deposit without actively mixing the neutralizing agent and the deposit so that water running off the deposit is not acidic.

\* \* \* \* \*